Figure 1:
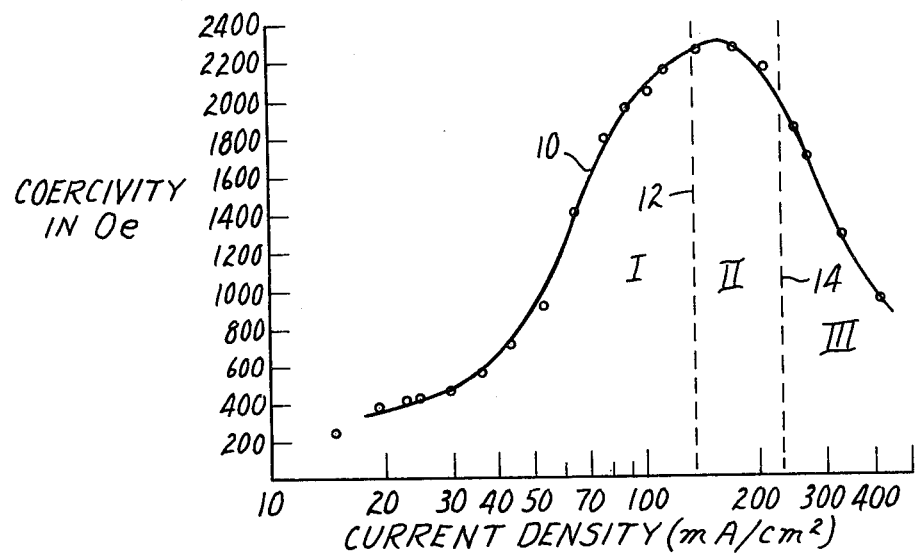

United States Patent [19]

Koskenmaki

[11] Patent Number: 4,472,248
[45] Date of Patent: Sep. 18, 1984

[54] METHOD OF MAKING THIN-FILM MAGNETIC RECORDING MEDIUM HAVING PERPENDICULAR ANISOTROPY

[75] Inventor: David C. Koskenmaki, Saint Paul, Minn.

[73] Assignee: Minnesota Mining and Manufacturing Company, Saint Paul, Minn.

[21] Appl. No.: 451,015

[22] Filed: Dec. 20, 1982

[51] Int. Cl.³ .............................................. C25D 3/56
[52] U.S. Cl. .................................................. 204/43 P
[58] Field of Search ...................................... 204/43 P

[56] References Cited

U.S. PATENT DOCUMENTS

| | | | |
|---|---|---|---|
| 2,644,787 | 7/1953 | Bonn et al. | 204/43 |
| 3,116,159 | 12/1963 | Fisher et al. | 117/71 |
| 3,578,571 | 5/1971 | McQuaid et al. | 204/43 P |
| 4,210,946 | 7/1980 | Iwasaki et al. | 360/131 |

OTHER PUBLICATIONS

Bondar, B., Elektrokhimiya, 5, (10), 1242-1243, (Russ), (1969).
I. Tsu et al., Plating, vol. 52, No. 11, pp. 1123-1126, Nov. 1965.
B. Ya. Kaznachel et al., Trudy Vsesoyuznogo Nauchnoissledoyatel'skogo Instituta Zvukozapisi, No. 6, pp. 119-135, (1957).
Chen, T. and Cavalotti, P., "Electroplated Cobalt Film for Perpendicular Magnetic Recording Medium", Applied Phys. Lett., 7/82.
Sato, M. and Hoshino, Y., "Magnetic Properties of Electrodeposited Co-Ni-P Recording Films", Denki Kagaku, 1967 (Japan).
Bate, G., "A Brief Review of High-Coercivity Thin Films for Digital Magnetic Recording", Journal of Applied Physics, Mar., 1966.
Koretzky, H., "Electrodeposited Magnetic Films: A Critical Survey", in Electrochemistry, Pergamon Press, 1965 at pp. 417, 429-433.
Judge, J. S., et al., "Flexible Recording Surfaces of Electrodeposited Cobalt-Nickel-Phosphorous", Plating, Apr., 1966, pp. 44-50.
Bate, G. and Speliotis, D. E., "Hard Magnetic Films of Co-Ni-P", Journal of Applied Physics, vol. 34, No. 4, (Part 2), pp. 1073-1074, Apr. 1963.

Primary Examiner—G. L. Kaplan
Attorney, Agent, or Firm—D. M. Sell; J. A. Smith; D. B. Little

[57] ABSTRACT

A magnetic recording medium having a magnetizable metallic thin-film layer of perpendicular anisotropy can be produced at commercially viable production rates by electrodepositing cobalt, hypophosphite, and preferably also nickel ions at a plating bath temperature of 50°-80° C. and a plating current density of at least 20 mA/cm².

5 Claims, 4 Drawing Figures

METHOD OF MAKING THIN-FILM MAGNETIC RECORDING MEDIUM HAVING PERPENDICULAR ANISOTROPY

TECHNICAL FIELD

The invention concerns a method of making a metallic thin-film magnetic recording medium having perpendicular anisotropy, i.e., an easy-axis of magnetization perpendicular to the plane of the thin-film layer.

BACKGROUND ART

While virtually all magnetic recording media now in use have magnetizable layers comprising magnetizable particles dispersed in organic binder, the amount of information that can be recorded in any such medium is reaching the theoretical limit. It has long been known that information can be recorded more compactly on metallic thin-film magnetic recording media such as the medium disclosed in U.S. Pat. No. 2,644,787 (Bonn et al.). That patent disclosed a method of electrodepositing onto an electrically conductive substrate a magnetizable layer from an aqueous plating bath having a pH in the range of 2 to 6 and including as essential elements nickel ions in a concentration in the range of 0.2 to 1.7N, cobalt ions in the range of 0.2 to 1.0N and hypophosphite ions in the range of 0.04 to 0.2N. Current densities ranged from 10 to 200 amperes per square foot (11 to 215 mA/cm$^2$) and bath temperatures were on the order of 45 to 55° C. with an upper limit of about 80° C. Higher temperatures may have produced spontaneous reduction throughout the bath. A specific product was reported to have a coercivity of approximately 810 oersteds and a remanence of the order of 10,000 gauss from a bath containing 0.84N in nickel, 0.84N in cobalt, 0.145N in hypophosphite ions, and ammonium chloride in 1.9 molar concentration, with a current density of 50 amperes per square foot (54 mA/cm$^2$) at 50° C.

U.S. Pat. No. 3,578,571 (McQuaid et al.) disclosed an effort to reduce the cost of thin-film magnetic recording media by reducing the high concentration of components in the plating bath. Improved coercivity levels and particularly squareness ratios were said to be achieved, although the reported coercivities were within the range of the Bonn patent. McQuaid's bath temperatures were between 32° and 66° C., and current densities were between 5 and 10 amps/dm$^2$ (50 and 100 mA/cm$^2$).

It can be assumed that the magnetic values of the Bonn and McQuaid media were measured in the planes of the coatings. Media made according to the example of each of those patents would exhibit mixed in-plane and perpendicular magnetic anisotropy.

Sato et al., "Magnetic Properties of Electro-deposited Co-Ni-P Recording Films", Denki Kagaku, Vol. 35, No. 2, pp. 111-15, 1967, (a publication in the Japanese language), also concerns electrodeposition of magnetizable thin-film coatings from a bath of cobalt, nickel and hypophosphite ions. The Sato publication reports that when the current density was kept low (0.5 A/dm$^2$ or 5 mA/cm$^2$), the magnetizable coating had perpendicular anisotropy. Somewhat higher current densities resulted in a distributed orientation, and at a current density of 2.0 A/dm$^2$ or 20 mA/cm$^2$, the coating had in-plane anisotropy. The only bath temperature mentioned was 25° C. The pH was 6.0.

Because the crystallite c-axes of electro-deposited coatings having in-plane anisotropy tend to be oriented in all planar directions, it is recognized that perpendicular anisotropy should enable more compact and efficient recording of information, since all crystallite c-axes can be oriented in the same direction. Also, magnetic recording media having perpendicular anisotropy exhibit a significantly reduced demagnetizing effect at high recording densities.

Recent efforts to develop thin-film magnetic recording media having perpendicular anisotropy have concentrated on cobalt-chromium coatings. See, for example, U.S. Pat. No. 4,210,946 (Iwasaki). No recent publications have been found concerning cobalt-nickel-hypophosphite electrodeposition, perhaps because of Sato's teaching of very low current densities to obtain perpendicular anisotropy, hence economically impractical rates of electrodeposition.

DISCLOSURE OF INVENTION

The present invention is an improvement over Sato by teaching conditions for making thin-film magnetic recording media having perpendicular anisotropy by electrodeposition at relatively high current densities, thereby providing economically viable rates of deposition. Like Sato's method, the method of the present invention involves electrodepositing onto an electrically conductive substrate a magnetizable coating from an aqueous plating bath having a pH between 2 and 6 and including at least cobalt and hypophosphite ions. Although always used by Sato, nickel ions are not important in the present invention unless high saturation magnetization is important. The cobalt and hypophosphite ion concentrations useful in practicing the present invention are comparable to those taught by Sato but are preferably within the ranges of 0.2 to 1.0N, and 0.1 to 0.4N, respectively, and the weight ratio of Co to P is between 5:1 and 50:1. Also comparable to Sato's teachings, nickel ions may be present up to about 1.5N as long as the ratio of Ni to Co does not exceed about 3 to 2. Also as in Sato, the aqueous bath may include a buffering agent such as ammonium chloride within a range of 1.0 to 3.0N.

The method of the present invention differs from that of Sato by maintaining a bath temperature and a plating current density of at least 20 mA/cm$^2$ within Region I of FIG. 2 of the drawing while keeping the temperature below a level that would produce excessive autocatalytic deposition.

Like many thin-film layers, the magnetizable thin-film layer of the present invention may have a thin, tough overcoating to protect it from contact with magnetic recording heads. Such a protective coating is especially useful when the recording medium is a flexible disk or tape, but less needed when the recording medium is a rigid disk.

Unless the substrate of the recording medium has an electrically-conductive surface, it is necessary to apply an electrically-conductive underlayer such as copper or permalloy, an alloy of about 80% nickel and 20% iron. Permalloy affords the added advantage of providing an efficient magnetic return path when using the medium for perpendicular recording. Because permalloy is only marginally electrically-conductive, it preferably is applied over a layer of copper. Both copper and permalloy may be conveniently applied by vapor deposition or sputtering.

When the substrate is a plastic film, the thickness of the electrically-conductive underlayer should be sufficient to prevent burning from resistive heating at the cathodic contacts to the film. One micrometer was sufficient for a moving 75-micrometer polyester film. When the substrate is an aluminum disk, an electrically-conductive underlayer may be desirable because aluminum is difficult to plate due to its rapid surface oxide formation.

THE DRAWING

Figure 2:
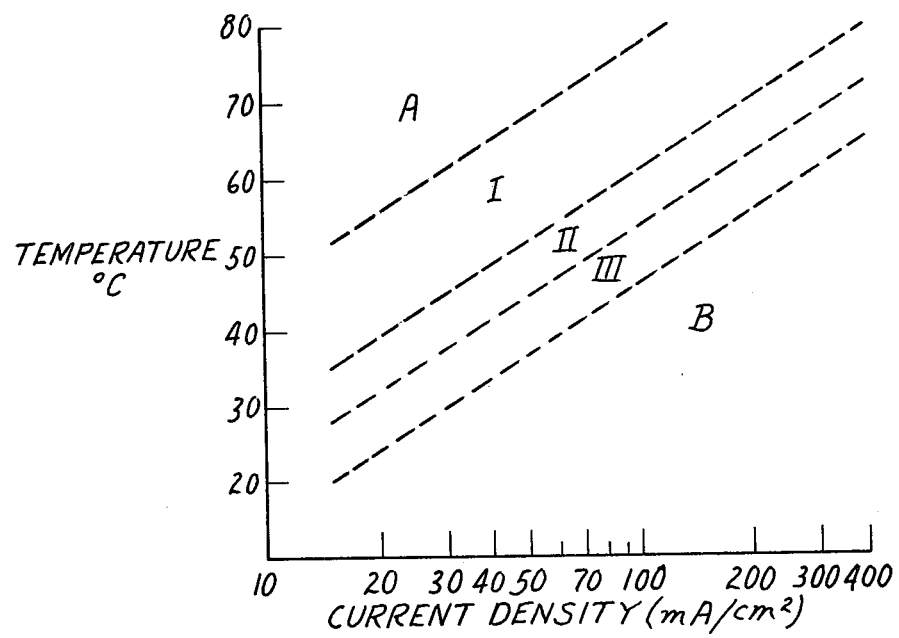
Figure 3:
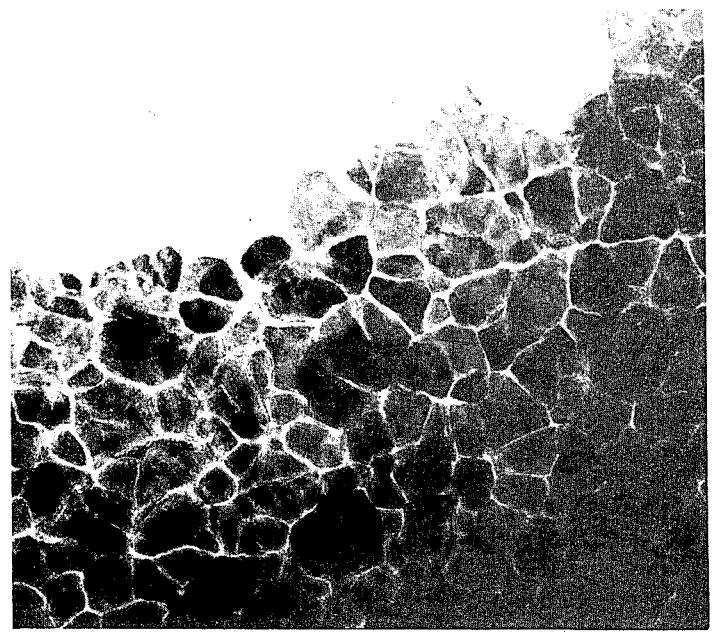
Figure 4:
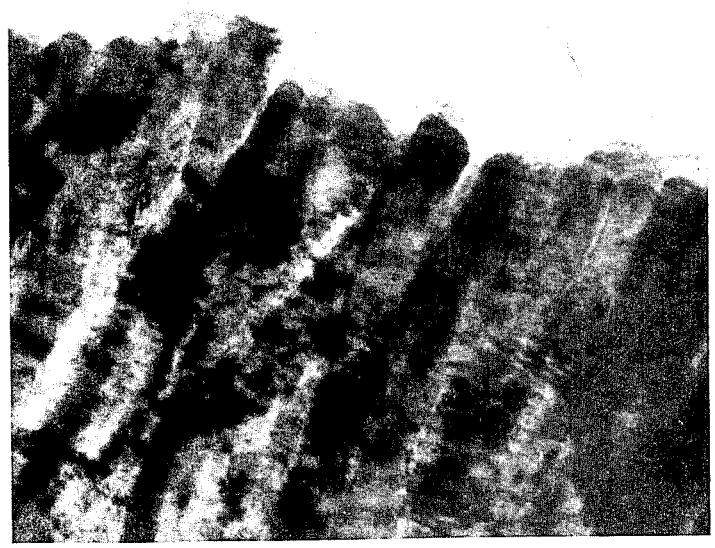

In the drawing:

FIG. 1 is a semi-log plot of coercivity measured perpendicularly as a function of current density for metallic thin-film magnetic recording media of the invention, which media were obtained by electrodeposition of preferred concentrations of cobalt, nickel and hypophosphite ions at a plating bath temperature of 65° C.;

FIG. 2 indicates the magnetic anisotropies of thin-film media of the present invention obtained by electrodeposition at various plating bath temperatures and current densities;

FIG. 3 is a photomicrograph at 300,000× magnification of an in-plane section of the magnetic recording layer of a thin-film magnetic recording medium of the invention; and FIG. 4 is a photomicrograph at 300,000× magnification of a perpendicular section through the magnetic recording layer of another thin-film magnetic recording medium of the invention.

FIG. 1 is a plot 10 of magnetometer measurements of coercivities perpendicular to the magnetic recording layers of the metallic thin-film magnetic recording media of Examples 1 and 2 which were electro-deposited from aqueous plating baths at 65° C. at various current densities. When deposited at current densities below about 135 mA/cm$^2$, as indicated by a dashed line 12 at the approximate edge of Region I, the recording layers should have perpendicular anisotropy. When deposited at current densities above about 230 mA/cm$^2$, as indicated by a dashed line 14 at the approximate edge of Region III, the recording layers should have in-plane anisotropy. Within the intermediate Region II, the deposit displays a mixture of in-plane and perpendicular anisotropy.

A decrease in the plating bath temperature has the same effect as an increase in current density. This effect is illustrated in FIG. 2 which shows the same three approximate Regions I, II and III of perpendicular, mixed, and in-plane anisotropy, respectively obtained at various bath temperatures and current densities as reported in Example 3. No appreciable variations in the boundaries of those regions have resulted from changes in concentrations within the ranges of 0.2 to 1.0N cobalt, 0 to 1.5N nickel and 0.1 to 0.4N hypophosphite ions.

Within Region I, a bright, shining, continuous, overall deposit of cobalt, nickel and phosphorous (hereinafter called "CoNiP") is obtained. In Region A beyond Region I, less than overall coverage may be obtained. In Region B beyond Region III, the deposit tends to have a black and burnt appearance, apparently due to microscopic irregularities, possibly stemming from hydroxides and other impurities in the deposit.

Since substantial autocatalytic deposition may occur at plating bath temperatures above about 80° C., the presently preferred temperature is about 75° C. in order to provide economical production rates with virtually no autocatalytic waste. At 75° C. and 240 mA/cm$^2$, a deposition rate of about 70 nm/sec is obtained. At 50° C. and 35 mA/cm$^2$, the deposition rate is only about 12 nm/sec. Lower deposition rates may be commercially impractical.

As indicated in FIG. 1, a coercivity of 2200 oersteds is obtainable at economical production rates. A CoNiP magnetic recording medium of the invention having that coercivity exhibited a saturation magnetization exceeding 12000 gauss. These values are higher than can be obtained with cobalt-chromium media which are presently the best known thin-film media exhibiting perpendicular anisotropy.

To obtain the photomicrograph of FIG. 3, the medium of Example 4 was carefully washed in acetone to remove its backside coating, after which the metallic thin-film deposit was masked with an identical coating. The exposed copper side was electrothinned using a 36% solution of orthophosphoric acid in water and a current density of 500 mA/cm$^2$. During thinning a jet of the solution was directed at the center of the sample to cause faster thinning near the center. When sufficient copper was removed to expose roughly a 3 mm diameter area of CoNiP deposit, the electrothinning was stopped and the masking coating was carefully removed with acetone. The sample was then electrothinned from both sides using the traditional window technique with a solution of 6% perchloric acid in methanol cooled in a dry-ice acetone bath.

The sample was mounted between two 75 mesh (3mm) grids and photographed at 100,000× using a JEM-200cx transmission electron microscope. Electron diffraction patterns show the grains to have their crystallite c-axes perpendicular to the sample surface.

The photomicrograph of FIG. 4 was obtained from the double-faced CoNiP medium of Example 5 by microtoming. These photomicrographs reveal the columnar nature of the grains. The columns are roughly 20–30 nm in diameter and mostly extend through the entire thickness of the deposit. The striations lying parallel to the surface within each column are due to stacking faults in the crystallite planes normal to the c-axis.

Energy dispersive X-ray studies using a JEM-200cx scanning transmission electron microscope suggest phosphorous has a higher concentration at the grain boundaries which, possibly in combination with hydroxides or other impurities, has a decoupling effect such that the individual grains act as single-domain areas. Phase contrast studies using the transmission electron microscope also suggest that the grain boundaries have a lower atomic density. The grain size obtained at the edge of Region I near Region II is on the order of 20 nm, and at the opposite edge of Region I near Region A is about 100 nm. Since smaller grain sizes provide higher coercivities, one obtains media of desired coercivities by selecting various areas of Region I.

From the above-reported and other studies it has been determined that magnetic recording layers of media of the invention have hexagonal, close-packed crystal structure. Electron diffraction studies indicate crystallite clusters about one micrometer in width, and the a-axes of all crystallites in each cluster lie in the plane of the plated area and in the same direction within about 3 or 4 degrees. The a-axes of crystallites of each cluster adjacent to that cluster lie in the same plane and are usually shifted about 30 degrees.

EXAMPLE 1

A piece of clean copper sheet was masked with pressure-sensitive adhesive tape to cover one face and to expose two areas on the other face, one 1.3 by 1.3 cm and the other 1.3 by 2.5 cm. An aqueous plating bath was prepared as follows: 56 g $CoSO_4.7H_2O$, 37 g $NiSO_4.6H_2O$, 19 g $NaH_2PO_2.H_2O$, and 75g $NH_4Cl$ were measured into a 1-liter beaker and water was added to make 700 ml of solution. These chemicals were A.C.S. grade. The resulting solution had the following normalities: 0.57N $CoSO_4.7H_2O$, 0.4N $NiSO_4.6H_2O$, 0.25N $NaH_2PO_2.H_2O$, and 2.0N $NH_4Cl$.

While heated to 65° C. in a 600 ml Pyrex beaker, 500 ml of the solution was slowly stirred, and the larger unmasked area of the piece of copper was immersed in the plating bath while electrical contact to the other unmasked area was made outside of the bath. Facing the immersed area at a distance of about 6 cm was a cobalt anode. The copper was plated for 30 seconds at 520 mA total current, giving an average current density of 160 $mA/cm^2$. The true current density at the center of the plated area of the resulting CoNiP metallic thin-film magnetic recording medium was determined to be 115 $mA/cm^2$. The thickness of the magnetizable thin-film layer at the center of the plated area was about 1.2 micrometers. The composition of the thin-film layer, found by X-ray fluorescence measurements, was 82.5% cobalt, 13.6% nickel and 3.9% phosporus by weight. X-ray and electron diffraction studies showed that all crystallite c-axes had a preferred orientation normal to the plane of the thin-film layer.

A magnetometer curve of magnetic moment versus applied field was determined at the center of the plated area. The coercivity measured perpendicular to the magnetometer field and the plated area was 2250 Oe and the saturation moment was 12,000 gauss. The shape of the curve indicated good perpendicular anisotropy.

EXAMPLE 2

A number of metallic thin-film magnetic recording specimens were prepared as in Example 1, except at 20 different current densities, while also adjusting the plating time to keep the deposit thicknesses equal. Magnetometer measurements provided data used to generate the plot 10 of FIG. 1.

EXAMPLE 3

A number of metallic thin-film magnetic recording specimens were prepared as in Example 1, except at various bath temperatures, while adjusting the plating times to keep the deposit thicknesses equal. Magnetometer measurements were used to generate FIG. 2 of the drawing.

EXAMPLE 4

A metallic thin-film magnetic recording medium was made as in Example 1 except at a bath temperature of 60° C. and an average current density of 60 $mA/cm^2$. Also, the piece of copper sheet was 1 cm square, had a thickness of 0.025 mm, and was completely unmasked on the face side, while the backside was masked by an acetone-soluble coating. Plating was completed in one minute to provide a CoNiP thin-film layer about 1.0 micrometer in thickness. This medium, which also had perpendicular anisotropy, was used in preparing the photomicrograph of FIG. 3 of the drawing.

The true current density at the center of the plated area was determined to be 45 $mA/cm^2$. The magnetometer curve of a sample taken from the center of the plated area showed the sample to have perpendicular anisotropy and a coercivity of 1400 Oe with a saturation magnetization of 11,900 gauss measured perpendicularly to the magnetometer field and the plated area.

EXAMPLE 5

A metallic thin-film magnetic recording medium was made as in Example 4 except the copper sheet was unmasked and thus plated on both sides of its one square cm area. The thickness of the thin-film layer was about 0.5 micrometer. This medium was used to provide FIG. 4 of the drawing.

EXAMPLE 6

A metallic thin-film magnetic recording medium was prepared as in Example 1 except as follows:
Unmasked plated area: 4 by 3.2 cm
Plating bath:
  0.46N $CoSO_4.7H_2O$
  0.46N $NiSO_4.6H_2O$
  0.24N $NaH_2PO_2.H_2O$
  1.9N $NH_4Cl$
  pH 4.3
Bath temperature: 55.7° C.
Plating time: 520 seconds
Average current density: 69 $mA/cm^2$ A circular disk 3 mm in diameter was punched from the medium at a position 0.8 cm from a short edge and 1.6 cm from a long edge. The disk was measured in the perpendicular direction in a vibrating sample magnetometer. Magnetic moment measurements indicated a thickness of 11 micrometers, and from comparisons of the thicknesses at other positions on the disk, the true current density used in plating the disk was determined to have been 60 $mA/cm^2$. Its coercivity was 2200 oersteds, and its saturation magnetization was 12,200 gauss. The shape of the magnetization versus applied field curve indicated that the sample had good perpendicular anisotropy. X-ray fluorescence showed 82.1% cobalt, 16.1% nickel and 1.9% phosphorous by weight.

I claim:

1. Method of making a magnetic recording medium comprising electrodepositing onto an electrically conductive substrate a magnetizable layer from an aqueous plating bath having a pH between 2 and 6 and including at least cobalt and hypophosphite ions in concentrations within the range of 0.2 to 1.0 N and 0.1 to 0.4 N, respectively, the weight ratio of Co to P in the magnetizable layer being between 5:1 and 50:1, wherein the improvement comprises maintaining a bath temperature and a plating current density within Region I of FIG. 2 of the drawing while maintaining a plating current density of at least 20 $mA/cm^2$ and a bath temperature between about 60° and 80° C., under which conditions the deposited layer has predominantly perpendicular magnetic anisotropy.

2. Method as defined in claim 1 wherein the bath includes nickel ions from about 0.4N to 1.5N in concentration, and the weight ratio of Ni to Co does not exceed about 3 to 2.

3. Method as defined in claim 1 wherein the current density is at least 100 $mA/cm^2$.

4. Method as defined in claim 1 wherein the bath includes a buffering agent within the range of 1.0 to 3.0N.

5. Method as defined in claim 4 wherein the buffering agent is ammonium chloride.

* * * * *